UNITED STATES PATENT OFFICE.

GEORGE M. MOWBRAY, OF NORTH ADAMS, MASSACHUSETTS.

IMPROVEMENT IN PRIMINGS FOR ELECTRIC BLASTINGS, &c.

Specification forming part of Letters Patent No. 161,432, dated March 30, 1875; application filed March 19, 1873.

CASE A.

*To all whom it may concern:*

Be it known that I, GEORGE M. MOWBRAY, of North Adams, in the county of Berkshire and State of Massachusetts, have invented an Improved Priming for Electric Blasting, Friction-Primers, &c., of which the following is a specification:

The nature of my invention is a composition of matter, being a mixture of the double-salt mercuric fulminate of cadmium, with an amalgam of mercury and cadmium, serving as a priming for electric fuses, friction-primers, percussion-shells, &c.

In order to prepare this composition, I add the diamagnectic metal cadmium to mercuric fulminate, so as to form the double salt of mercuric fulminate of cadmium without removing the freed mercury displaced by the cadmium, which I use in excess, thus forming an amalgam of mercury and cadmium, as well as the double salt above mentioned, which, without the intervention of the amalgam, would be too dangerous for the uninstructed workman to handle in charging the fuse-caps, and also for the miner to use in the operation of blasting, &c. The composition whose preparation I am about to relate can be manipulated with safety, and can be exploded with a slight spark from the friction-battery or Ruhmkorff coil, being extremely sensitive to the electric discharge or friction, and gives a sharp detonation when exploding. I take mercuric fulminate and metallic cadmium in very fine filings, equal parts by weight of each, distilled water sufficient to cover the mixture to the depth of half an inch, and digest these in a porcelain dish at a temperature of about 65° Fahrenheit for twelve hours, by which time the metal and fulminate will be found to have aggregated to a caked mass beneath the water. The porcelain containing-vessel is now removed to a water-bath, and warmed with its contents, to the temperature of 80° Fahrenheit. The aggregated mass is broken up with an ivory spatula from time to time, until, by evaporation of the water, a pasty mass remains. This is introduced, in quantity of half a grain to a grain, between the terminals of two wires, and so secured that the electric current or spark, in passing, shall not disperse it, and, when dried, must be hermetically sealed.

For blasting purposes, on passing a strong voltaic current, or a spark from a frictional electric machine or induction-coil, between the terminals of the wires, it will instantly explode. The detonation is very violent, and great care is necessary to avoid surprise or grave accidents.

Without limiting myself to the exact proportions,

I claim as my invention—

The above-described composition of cadmium and fulminate of mercury, as a priming for electric fuses, friction-primers, percussion-fuses for shells, torpedoes, &c.

GEO. M. MOWBRAY.

Witnesses:
W. H. GRISWOLD,
WM. K. BARLOW.